United States Patent
Chiu et al.

(10) Patent No.: US 6,851,722 B2
(45) Date of Patent: Feb. 8, 2005

(54) COUPLED CIRCULATION TUBE FOR BALL SCREW UNIT

(75) Inventors: Yueh-Ling Chiu, Taichung (TW); Paul Yang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 282 days.

(21) Appl. No.: 10/029,273

(22) Filed: Dec. 28, 2001

(65) Prior Publication Data

US 2003/0062719 A1 Apr. 3, 2003

(51) Int. Cl.$^7$ ............................. F16L 43/00; F16H 55/02
(52) U.S. Cl. ................ 285/134.1; 285/419; 74/424.82; 74/424.86; 74/424.87
(58) Field of Search ..................... 285/134.1, 135.1, 285/419, 913, 286.1, 288.6; 74/424.81, 424.82, 424.83, 424.85, 424.86, 424.87

(56) References Cited

U.S. PATENT DOCUMENTS

| | | | | | |
|---|---|---|---|---|---|
| 1,158,307 A | * | 10/1915 | Schmidt | ................... | 285/288.6 |
| 1,446,274 A | * | 2/1923 | Percy | ...................... | 285/288.6 |
| 1,515,355 A | * | 11/1924 | Harbour | .................. | 285/288.6 |
| 2,739,018 A | * | 3/1956 | Collett | ....................... | 285/419 |
| 3,006,212 A | * | 10/1961 | Gaionska | ................. | 74/424.82 |
| 3,143,896 A | * | 8/1964 | Edwards | .................. | 74/424.86 |
| 3,971,264 A | * | 7/1976 | Detraz et al. | ............ | 74/424.87 |
| 4,235,122 A | * | 11/1980 | Walter | ..................... | 74/424.87 |
| 4,364,282 A | * | 12/1982 | Nilsson | ................... | 74/424.82 |
| 4,572,548 A | * | 2/1986 | Porowski et al. | .......... | 285/419 |
| 4,750,378 A | * | 6/1988 | Sheppard | ................. | 74/424.87 |
| 5,005,436 A | * | 4/1991 | Brusasco | ................. | 74/424.87 |
| 5,007,666 A | * | 4/1991 | Kyfes | ........................ | 285/419 |
| 5,493,929 A | * | 2/1996 | Namimatsu et al. | ..... | 74/424.82 |
| 6,681,651 B2 | * | 1/2004 | Fujita | ..................... | 74/424.86 |

* cited by examiner

*Primary Examiner*—David Bochna
(74) *Attorney, Agent, or Firm*—Bacon & Thomas

(57) ABSTRACT

A coupled circulation tube for a ball screw unit. The tube is formed on a planar surface at one side of the ball screw bearing, each tube joined to two circulation holes. Each circulation tube is formed by coupling two symmetrical rigid metallic half tubes at recessed grooves and flanges interposedly arrayed one after another longitudinally along the wall of each half tube to form a resultant U shaped arcuate elbow tube for ball circulation such that it is firmly constructed with a desired toughness free from loosening, cracking or deforming by constant collision and abrasion of the rolling balls.

4 Claims, 6 Drawing Sheets

COUPLED CIRCULATION TUBE FOR BALL SCREW UNIT

BACKGROUND OF THE INVENTION

1. Field of the Invention

The present invention relates to a coupled circulation tube for ball screw unit, in particular, to a circulation tube symmetrically coupled with two half arcuate elbow tubes for ball screw unit so as to simplify the molding die, increase the mechanical toughness, and cut down the production cost.

2. Description of the Prior Art

In a conventional arcuate elbow tube for a ball screw unit, it is formed of two pieces of a first half arcuate elbow tube and a second half arcuate elbow tube parallelly simple contacted together to configure into a hollow snugly curved U shape tube for the rolling balls to circulate smoothly therein.

As the above described U shape elbow tube is parallelly coupled with two half pieces, it is subjected to inevitable and constant impact and collision of balls rolling inside for a long time ultimately resulting in a fatal damage to the operation of the apparatus due to metallic fatigue and scars produced by collision and abrasion of the balls on the inner surface of the circulation tube.

The above mentioned arcuate elbow tube as that to be applied for the circulation tube for a ball screw unit has not yet been able to be formed integrally in one piece. A circulation tube engaged with two half tubes always has a weakness of cracking at the bonding seam so that the basic requirement to assure a certain toughness is beyond one's power. Aiming at the above depicted defects, the present invention is to propose a newly developed coupled circulation tube for ball screw unit capable of eliminating the disadvantages of the conventional product described above.

SUMMARY OF THE INVENTION

It is an object of the present invention to provide a coupled circulation tube for a ball screw unit in which the circulation tube is symmetrically coupled with two half arcuate elbow tubes like an object and its reflected image of a plane mirror so as to simplify the fabrication, improve the mechanical toughness, and cut down the production cost.

It is a further object of the present invention that by such a coupled circulation tube the rolling balls are provided with an outer circulation pathway to smoothly and snugly travel around.

For achieving such objects, the coupled circulation tube is formed on the planar surface at one side of the ball screw bearing each tube jointing to two circulation holes. Each circulation tube is coupled of two symmetrical metallic half tubes by a plurality of recessed grooves and flanges interposedly arrayed one after another longitudinally along the wall of each half tube thereby coupling into a resultant U shaped arcuate elbow tube for ball circulation such that it is firmly constructed with a desired toughness free from loosening, cracking or deforming by constant collision and abrasion of the rolling balls.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
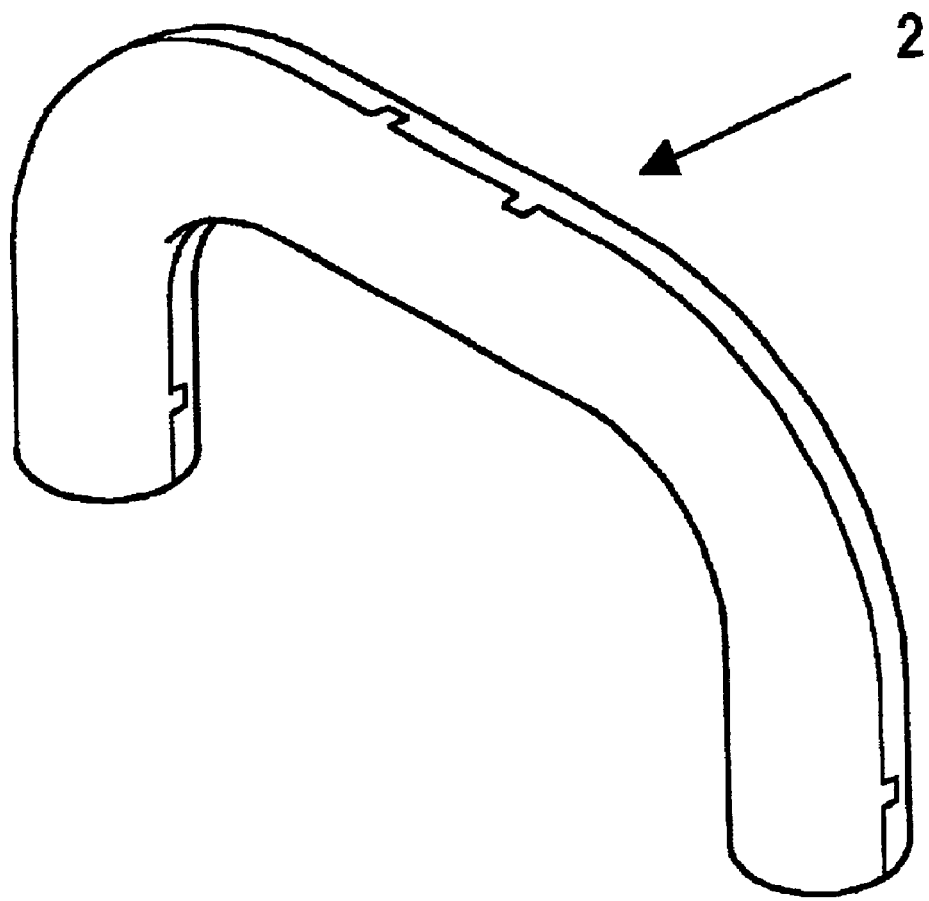
FIG. 1 is a three dimensional assembled view of the coupled circulation tube of the present invention.
Figure 2:
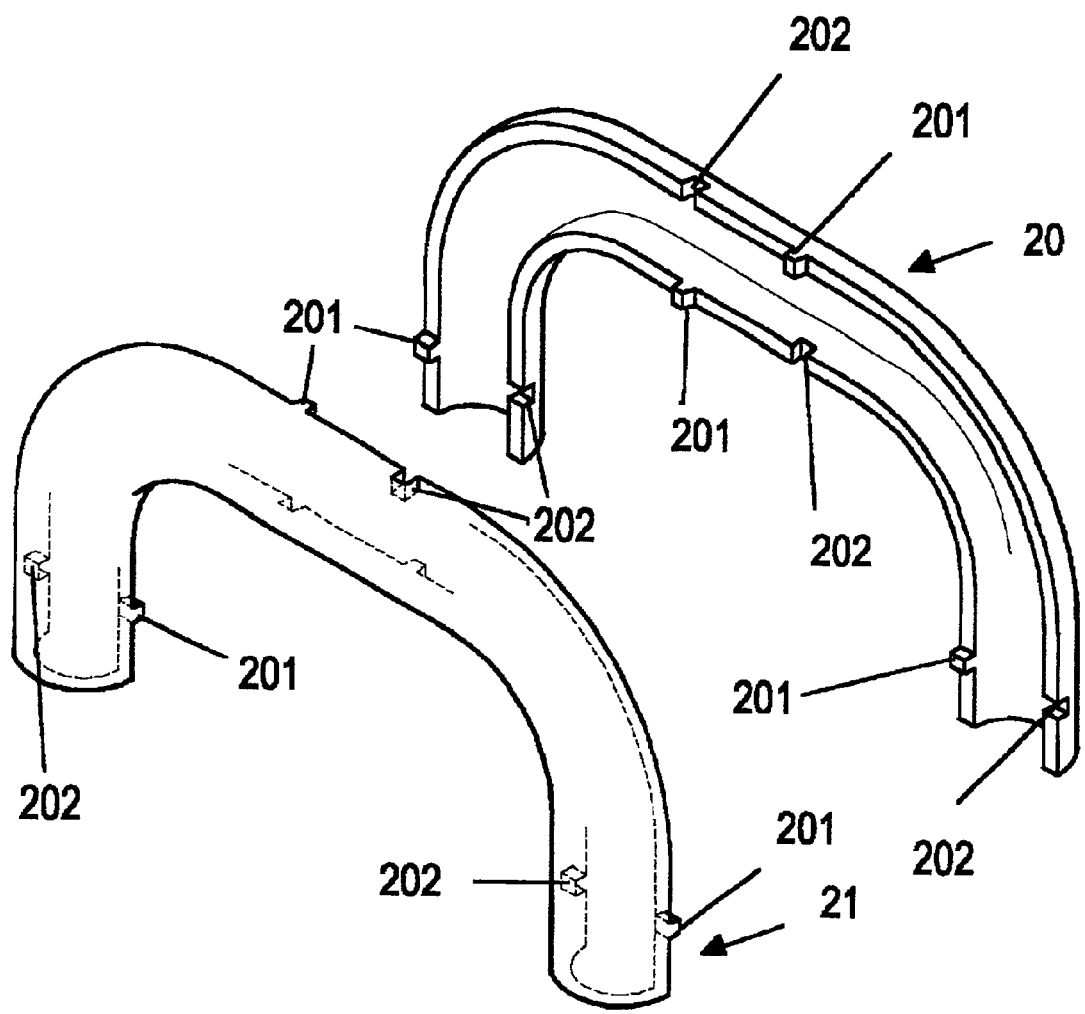
FIG. 2 is an illustrative exploded view of the coupled circulation tube of the present invention.

Referring to FIG. 1 together with FIG. 2, as it is clearly shown in FIG. 2, the arcuate elbow tube 2 is composed of a first half elbow tube 20 and a second half elbow tube 21 wherein both component tubes 20 and 21 being respectively made integrally in one piece of a metallic material and are symmetrically facing to each other like an object and its image reflected by a plane mirror.

Figure 3:
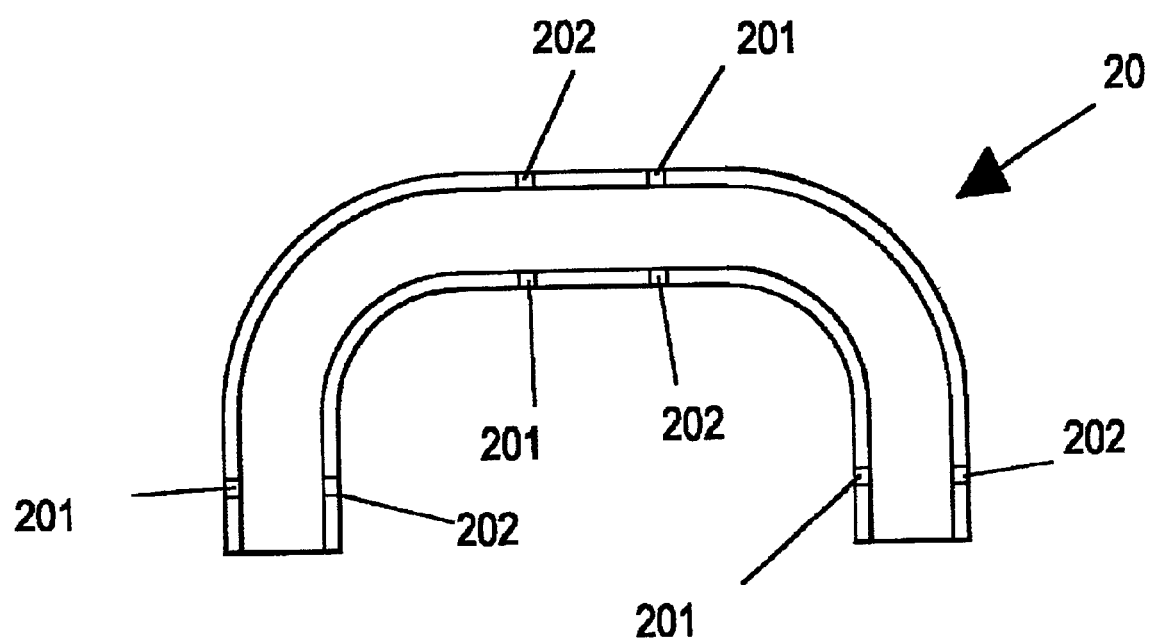
FIG. 3 is a plane view of a half-arcuate elbow tube of the coupled circulation tube of the present invention.
Figure 4:
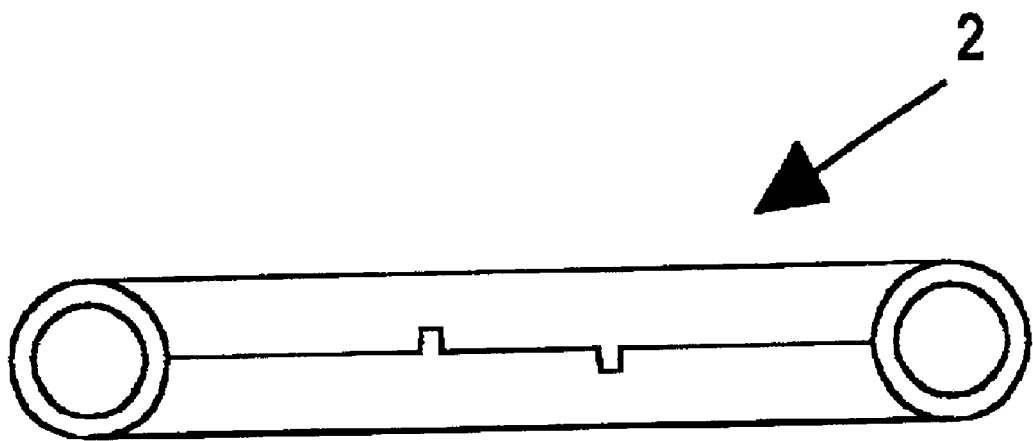
FIG. 4 is a top view of the coupled circulation tube of the present invention.

Referring to FIG. 3, there are a plurality of flanges 201 and recessed grooves 202 interposedly arrayed one after another along the wall of each half tube to be coupled into a resultant U shaped arcuate elbow tube 2 as shown in FIGS. 1 and 4, and then engagement therebetween is further enhanced by welding. Besides, the arrayed flanges 201 and grooves 202 may be formed into a swallow-tailed configuration.

Figure 5:
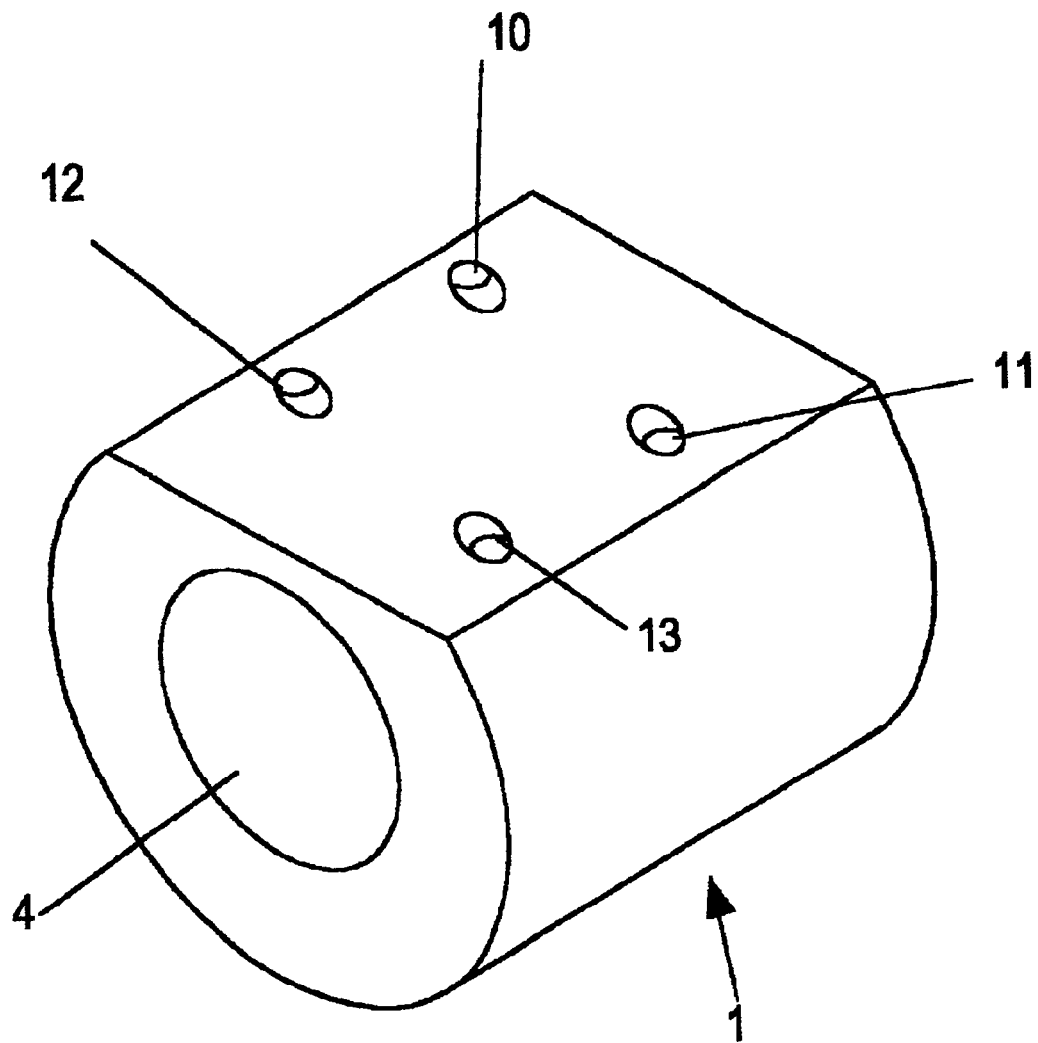
FIG. 5 is a schematic view showing the ball screw bearing.
Figure 6:
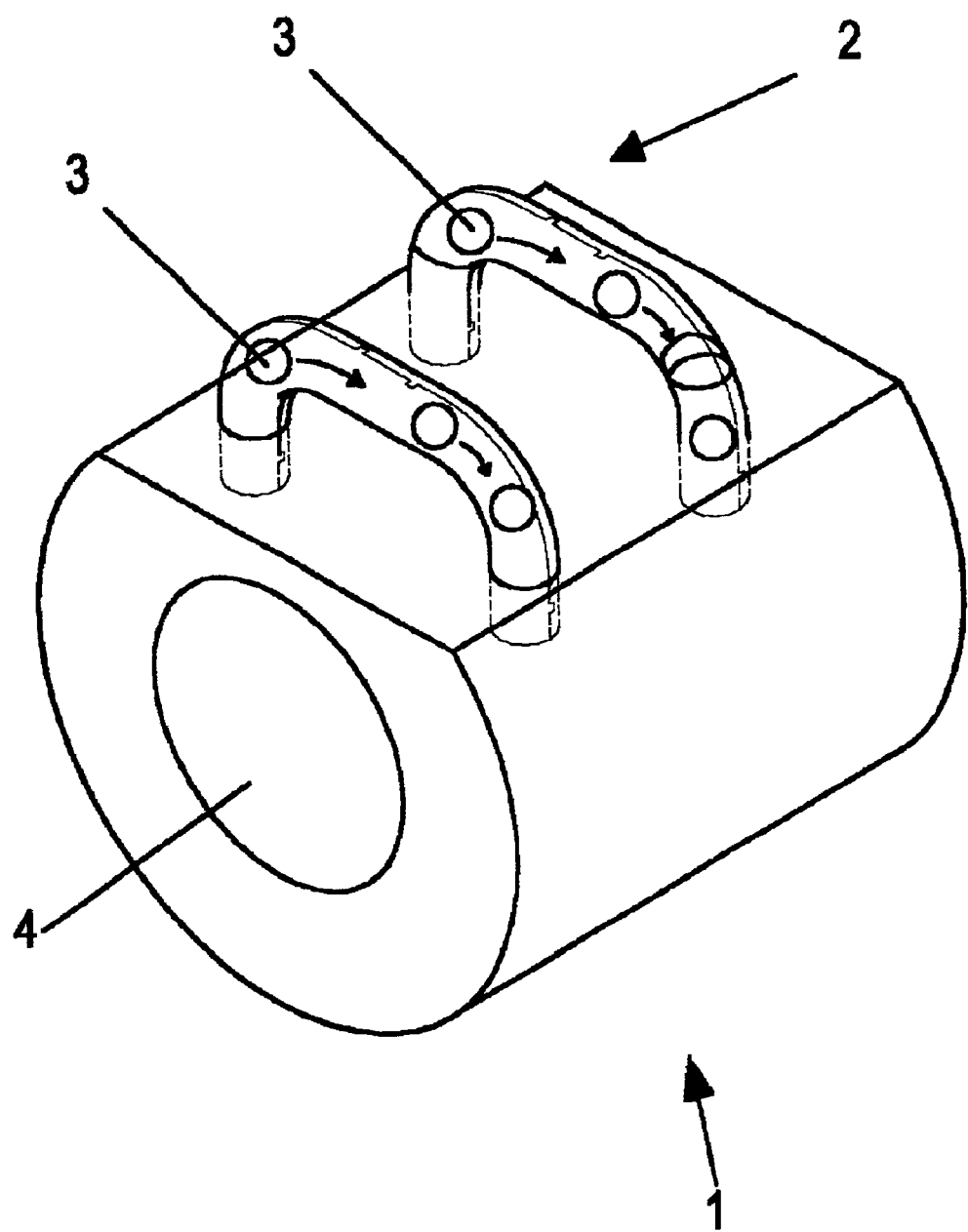
FIG. 6 is an illustrative three-dimensional view showing a section of the ball screw unit equipped with two coupled circulation tubes of the present invention.

Referring to FIG. 5 together with FIG. 6, as shown in FIG. 6, there is one of the coupled arcuate elbow tube 2 fitted to a Pair of circulation holes 10, 11 opened on the upper side planar surface of the ball screw bearing 1 with its both tube ends from the vertical direction to the surface thereof, and another coupled arcuate elbow tube 2 is fitted to another pair of circulation holes 12, 13 just in the similar manner described above. A screw bolt 4 passing through the bearing 1 is then moved longitudinally therein when a plurality of balls 3 roll along the elbow tube 2.

From the above description, it is easily understood that the coupled circulation tubes of the present invention has several noteworthy advantages in particular:

1. An integrately formed metallic component tubes coupled mutually together with flanges and grooves, and further enhanced by welding ensures perfect structural firmness and toughness and exhibits a strong resistant against impact of rolling balls with mutual engaging force of the two coupled component tubes.

2. The fabrication process associated with the molding die can be simplified which results in largely cutting down the production cost.

Those who are skilled in the art will readily perceive how to modify the invention. Therefore the appended claims are to be construed to cover all equivalent structures which fall within the true scope and spirit of the invention.

What is claimed is:

1. A coupled circulation tube for ball screw bearing, comprising:

an arcuate bent tube formed of first and second bent tubes coupled together and ends thereof installed on respective circulation holes on a formed planar surface of the ball screw bearing; and a plurality of recessed grooves and flanges formed longitudinally on said first and second half bent tubes arrayed in a geometrically staggered manner facing against each other such that said half bent tubes are coupled successively with each other with opposing ones of the grooves and flanges interlocking together into a resultant U-shaped arcuate elbow tube for ball circulation therein, and wherein the flanges interlocked into respective ones of the grooves form parts of inner and outer walls of the U-shaped arcuate elbow tube.

2. The coupled circulation tube of claim 1, wherein said coupled circulation tube is formed of a metallic material.

3. The coupled circulation tube of claim 2, wherein said coupled circulation tube is formed of a rigid metallic material.

4. The coupled circulation tube of claim 1, wherein said two half tubes are coupled with each other by the plurality of recessed grooves and flanges.

* * * * *